Feb. 6, 1968   R. D. WATSON   3,367,020
METHOD OF PREPARING TUBES OF CERTAIN METALS
FOR SUBSEQUENT JOINING BY WELDING
Filed May 19, 1965

INVENTOR
ROBERT D. WATSON
By
PATENT AGENT

United States Patent Office 3,367,020
Patented Feb. 6, 1968

3,367,020
METHOD OF PREPARING TUBES OF CERTAIN METALS FOR SUBSEQUENT JOINING BY WELDING
Robert D. Watson, Box 86, 9 Cabot Place, Deep River, Ontario, Canada
Filed May 19, 1965, Ser. No. 457,019
4 Claims. (Cl. 29—475)

ABSTRACT OF THE DISCLOSURE

A method of preparing metal tubes of stainless steel, zirconium, or zirconium alloy for subsequent joining by welding wherein a taper having a slightly flat leading edge is formed at the end of the tube, heating the tube in air above 400° C. for a time sufficient to form a thin oxide layer on its surface, pressing the tapered end of the tube into a block of aluminum heated to 500° C. to bond the tube to the block, and cutting away unwanted portions of the aluminum to leave an aluminum end on the tube that can be readily welded to other tubes similarly equipped.

This invention relates to hot press bonding of metals and more particularly to a method of joining metallic members especially tubes which are normally difficult to join.

In nuclear reactor technology, there is a need for a simple and straightforward method of joining metallic members, such as tubes, without the need for heavy and complex welding equipment or other joining devices. The thermal, mechanical, and nuclear requirements of reactors dictate the type of metals that may be used in their construction. The metals that best meet these requirements are stainless steel, zirconium, zircaloy, and certain other metals that are normally difficult to weld or otherwise work. In addition, it is foreseen that reactors will be bulit in remote places and there will be a need for a simple method of joining the very large number of tubes involved in a reactor during construction and also later during maintenance. Any joints that are made must be well bonded in that the leakage and safety requirements of reactors are quite stringent.

It is an object of the present invention to provide a simple and straightforward method of joining tubes made of metals such as stainless steel, zirconium, or zircaloy wherein the joints are well bonded and therefore highly reliable.

Another object of the invention is to provide a method of joining tubes wherein the ends of the tubes can be prepared in centrally located machine shops and where the final joint can be easily carried out in the field or in remote locations without the need for complex or heavy equipment.

These and other objects of the invention are achieved by forming a taper on the end of the tube to be joined, heating the tube in air to form an oxide layer thereon, pressing the tube into a block of heated metal of the group including aluminum, zirconium, or zirconium alloy, and cutting away the metal as required to form an endfitting on the tube. The tube prepared in this way can be readily joined in the field to a similar tube or to other devices by standard welding techniques.

Figure 1:
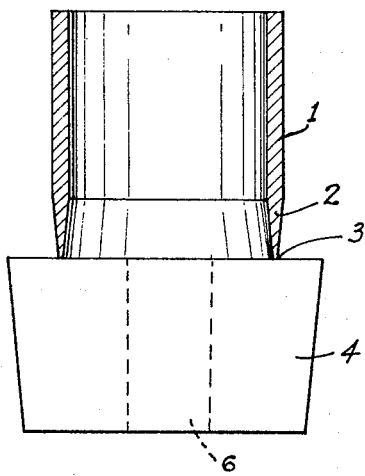
Figure 2:
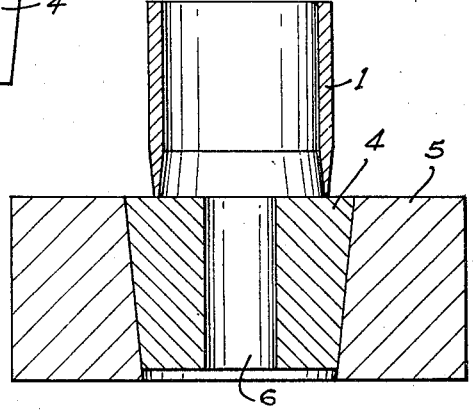
Figure 3:
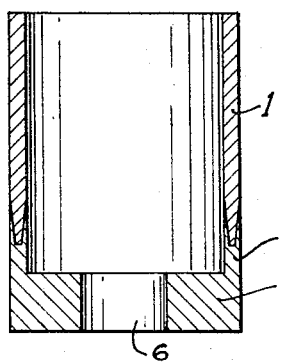

In drawings which illustrate embodiments of the invention,

FIGURE 1 shows a cross-section of a metal tube prior to hot pressing with a block of aluminum, zirconium, or zirconium alloy, FIGURE 2 is similar to FIGURE 1 but shows a block of aluminum, zirconium, or zirconium alloy positioned in a die, and FIGURE 3 shows a metal tube after it has been pressed into the aluminum, zirconium, or zirconium alloy and unwanted parts of the metal have been cut away.

Referring to FIGURE 1, a metal tube 1 has a taper formed in one end as shown at 2. The leading edge of the tapered end of the tube is left flat as shown at 3. The tube is placed as shown on a block of metal 4 which may have a central opening 6 (shown dotted). To perform the operation, the metal tube 1 is pre-heated in air at a temperature of about 500° C. for approximately 30 minutes. A very thin oxide layer forms on the surface of the tube. The tube is then placed on a block of metal (aluminum, zirconium, or zirconium alloy) which has been heated to a temperature of at least 500° C. The tube is pressed into the block to the full depth of the taper. It has been found that tubes of stainless steel, zirconium, and zirconium alloy can be pressed into aluminum blocks and tubes of stainless steel can be pressed into zirconium or zirconium alloy with good bonds between metals being achieved. In the case of stainless steel tubes being hot pressed into zirconium or zirconium alloy the temperature of the block should be approximately 700° C.

FIGURE 2 illustrates a procedure similar to that of FIGURE 1 but, in this case, the block is held in a die 5. This prevents the outward distortion of the block during the pressing operation.

After the pressing operation has been carried out, excess portions of the metal are cut away.

FIGURE 3 shows a specimen after this has been done. In this case, an end fitting 4 having a central hole 6 has been left. If it is required that the tubes after joining be continuous, then only the tubular portion 7 would be left. It can be seen that a metal tube that has been prepared this way with an aluminum, zirconium, or zirconium alloy end fitting could be readily joined to another tube by means of standard welding techniques.

It has been found that good bonds have been made between the metal tube and the metal block after the pressing operation. The thin coating of oxide assists in the bond and prevents the buildup of an intermetallic layer which is usually brittle and leads to discontinuities resulting in poor bonds. The taper on the end of the tube is preferably symmetrical, i.e. the angle of the taper is the same on the inner and outer surfaces of the tube and best results have been obtained where a flat leading edge has been formed on the end of the tapered portion of the tube. If the taper is not symmetrical and the leading edge is sharp, it has generally been found that the pressing action results in a poor bond as the end of the tube has a tendency to flare outwards or turn inwards in the metal block.

After the tube has been formed with an end fitting as above, it has been found that if the assembly is again heated in air for a short time an oxide layer will form on the surface of the metal. This layer helps to prevent corrosion.

What is claimed is:
1. A method of preparing tubes of metals of the group consisting of stainless steel, zirconium, zirconium alloy for subsequent welding comprising:
  (a) forming a taper on the end of the tube,
  (b) leaving the leading edge of the tapered end of the tube slightly flat,
  (c) heating the tube in air at a temperature above 400° C. for a time sufficient to form a thin oxide layer on its surface,
  (d) pressing the tube into a block of aluminum heated to at least 500° C. to the depth of the taper to bond the tube to the block,

(e) cutting away unwanted portions of the aluminum to leave an aluminum end on the tube that can be readily welded to other tubes similarly equipped.

2. A method of joining tubes as in claim 1 wherein the taper formed on the end of the tube is symmetrical with the taper angle the same on both the inner and outer surfaces of the tube.

3. A method of preparing tubes of stainless steel for subsequent welding comprising:
  (a) forming a taper on the end of the tube,
  (b) leaving the leading edge of the tapered end of the tube slightly flat,
  (c) heating the tube in air at a temperature above 400° C. for a time sufficient to form a thin oxide layer on its surface,
  (d) pressing the tube into a block of zirconium or zirconium alloy heated to a temperature of about 700° C. to the depth of the taper to bond the tube to the block,
  (e) cutting away unwanted portions of the zirconium or zirconium alloy to leave an end on the tube that can be readily joined to other tubes similarly equipped.

4. A method of joining tubes as in claim 3 wherein the taper formed on the end of the tube is symmetrical with the taper angle the same on both the inner and outer surfaces of the tube.

References Cited

UNITED STATES PATENTS

| | | | |
|---|---|---|---|
| 1,716,140 | 6/1929 | Kirwer | 29—472.9 |
| 1,834,581 | 12/1931 | Ferrell et al. | |
| 1,935,063 | 11/1933 | Scott | 29—482 |
| 2,336,488 | 12/1943 | Litton | 29—472.5 |
| 2,751,808 | 6/1956 | MacDonald et al. | 29—470.1 X |
| 2,850,798 | 9/1958 | Bowman et al. | 29—482 |
| 2,998,646 | 9/1961 | Hitz | 29—482 X |
| 3,040,427 | 6/1962 | Howell | 29—482 X |
| 3,191,276 | 6/1965 | Gwyn | 29—470.1 X |
| 3,203,715 | 8/1965 | Benbenek | 29—472.9 X |
| 3,217,398 | 11/1965 | Prestige | 29—432 |

JOHN F. CAMPBELL, *Primary Examiner.*

PAUL M. COHEN, *Assistant Examiner.*